United States Patent
Breslau et al.

[19]

[11] Patent Number: 6,101,501
[45] Date of Patent: *Aug. 8, 2000

[54] PROCESS AND SYSTEM FOR RUN-TIME INHERITANCE AND DISINHERITANCE OF METHODS AND DATA

[75] Inventors: Franklin Charles Breslau, Teaneck, N.J.; Paul Gregory Greenstein, Croton-On-Hudson; John Ted Rodell, Wappingers Falls, both of N.Y.

[73] Assignee: International Business Machines Corporation, Armonk, N.Y.

[*] Notice: This patent is subject to a terminal disclaimer.

[21] Appl. No.: 09/053,542

[22] Filed: Apr. 1, 1998

Related U.S. Application Data

[63] Continuation of application No. 08/579,543, Dec. 27, 1995, Pat. No. 5,758,349.

[51] Int. Cl.[7] ................................................. G06F 17/30
[52] U.S. Cl. ........................ 707/103; 707/100; 707/102; 709/303
[58] Field of Search ..................... 707/103, 102, 707/104, 100; 395/683; 709/303

[56] References Cited

U.S. PATENT DOCUMENTS

| | | | |
|---|---|---|---|
| 5,121,478 | 6/1992 | Rao ...................................... | 340/825.72 |
| 5,265,206 | 11/1993 | Shackelford et al. ................... | 395/683 |
| 5,313,630 | 5/1994 | Namioka et al. ........................ | 395/614 |
| 5,313,633 | 5/1994 | Tomita et al. ............................ | 395/601 |
| 5,379,432 | 1/1995 | Orton et al. .............................. | 395/683 |
| 5,404,525 | 4/1995 | Endicott et al. ......................... | 395/702 |
| 5,421,016 | 5/1995 | Conner et al. ........................... | 395/707 |
| 5,437,025 | 7/1995 | Bale et al. ................................ | 707/103 |
| 5,493,680 | 2/1996 | Danforth .................................. | 395/702 |
| 5,493,682 | 2/1996 | Tyra et al. ................................ | 395/703 |
| 5,499,333 | 3/1996 | Doudnikoff et al. .................... | 395/777 |
| 5,659,751 | 8/1997 | Heninger ................................. | 395/685 |
| 5,732,263 | 3/1998 | Havens et al. ........................... | 707/103 |
| 5,758,349 | 5/1998 | Breslau et al. ........................... | 707/103 |
| 5,778,227 | 7/1998 | Jordan ...................................... | 395/682 |
| 5,826,073 | 10/1998 | Ben-Meir et al. ....................... | 712/226 |

FOREIGN PATENT DOCUMENTS

0619544A2  10/1994  European Pat. Off. ........... G06F 9/44

OTHER PUBLICATIONS

Komatsu, H. and Maruyama, K., "Method of Extended Linking Using Identification Files," IBM Technical Disclosure Bulletin, vol. 33, No. 10B, pp. 304–309, Mar. 1991.

Decker, S.R., "Process Element Wrapper and the Context Verb Object Method Registry," IBM Technical Disclosure Bulletin, vol. 34, No. 10A, pp. 433–435, Mar. 1992.

Calo, S.B. and Finkel, A., "Mechanism for Incorporating Secondary Inheritance in Object–Oriented Systems," IBM Technical Disclosure Bulletin, vol. 36, No. 09B, pp. 417–418, Sep. 1993.

Poon, R., "Dynamic Data Conversion for Software Release Compatibility by Object Oriented Programming," IBM Technical Disclosure Bulletin, vol. 37, No. 2A, pp. 209–212, Feb. 1994.

*Primary Examiner*—John E. Breene
*Assistant Examiner*—Greta L. Robinson
*Attorney, Agent, or Firm*—Heslin & Rothenberg, P.C.; Edward H. Duffield, Esq.

[57] ABSTRACT

In an object-oriented run-time environment, inheritance and disinheritance of methods and data to and from an object is facilitated. When an object is invoked, a method within the object is called. Execution of this method may, however, not be possible because, e.g., a data type passed to the method may not be supported thereby. In response to this condition, the object invokes a process that inherits a required method and/or datum into the object. For example, a method that does support the previously unsupported data type may be inherited. After inheritance is completed, the object is reinvoked with the previously unsupported data type. Processing may then continue using the inherited method. After the inherited method is no longer needed, it may be disinherited from the object.

9 Claims, 5 Drawing Sheets fig. 1 fig. 2 fig. 3 fig. 4 fig. 5 fig. 6

PROCESS AND SYSTEM FOR RUN-TIME INHERITANCE AND DISINHERITANCE OF METHODS AND DATA

CROSS-REFERENCE TO RELATED APPLICATIONS

This Application is a continuation of the United States Patent Application entitled "PROCESS AND SYSTEM FOR RUN-TIME INHERITANCE AND DISINHERITANCE OF METHODS AND DATA," filed Dec. 27, 1995, Ser. No. 08/579,543, now U.S. Pat. No. 5,758,348.

TECHNICAL FIELD

The present invention relates in general to management of objects in an object-oriented programming environment and to object-oriented programming. More specifically, the present invention relates to a process and system for modifying objects through inheritance and disinheritance of methods and data at run-time.

BACKGROUND OF THE INVENTION

Current computer programming techniques include the use of Object-Oriented Programming ("OOP"). Object-Oriented Programming centers on reusable, self-contained, callable program code modules known in the art as 'objects'. Such a modular approach makes software development more efficient and reliable through the use and reuse of proven, tested objects.

Each object is designed to accomplish a predefined set of operations through "methods" and associated data. These methods include programmed tasks for the object to perform when called upon to do so. Each particular method is defined within a 'class' associated with an object. The class acts as a template that describes the behaviour of a group of similar objects. An object is instantiated from (or is a runtime instance of) a selected class, and includes methods and attributes (or data) defined in the class.

Unfortunately, current object-oriented programming does not enable the addition or deletion of the methods and/or data of an object (defined within the associated classes) at run-time. A programmer must therefore choose the methods and data that an object will implement by defining an appropriate class, with the required methods and data, prior to initial instantiation of the object. As a result, certain methods and data may be required at run-time, but will be unavailable within the object. Thus, all possibly required methods and data are included in the class when originally defined, and the size of the object (i.e., its "footprint") instantiated therefrom becomes accordingly large.

As an example, a particular object may include a method that performs floating-point matrix calculations using a vector processing facility. However, on occasion, the vector processing facility may be unavailable, such that the object requires software emulation routines for floating-point matrix calculations. Conventional techniques require that the object include methods and data for both software emulation based floating-point matrix calculations and vector facility based floating point matrix calculations. This results in an object with a large footprint, wherein the software-emulation routines are used infrequently. System resources are therefore not efficiently utilized.

The present invention is directed toward solutions for the above noted problems.

SUMMARY OF THE INVENTION

In a first aspect, the present invention operates in an object-oriented run-time environment, wherein an object is instantiatable and includes a content. The content includes at least one of a method and a datum. The method is for performing at least one designated function, and the datum is for storing at least one valve. The present invention includes a process for altering the object at run-time. Specifically, the process comprises identifying and performing an alteration to the content of the object.

As an enhancement, the altering may comprise either an addition or a deletion of a designated method and/or datum to or from the content of the object. The altering may further comprise deleting the object and then reinstantiating the object with an altered content. Advantageously, this is performed transparent to the object's user. Usage of the object may be suspended before the altering and resumed after the altering.

As further enhancements, adding the designated method and/or datum to the object may comprise deleting the object and reinstantiating the object having the designated method and/or datum from a designated class. As one specific example, the reinstantiating may comprise replacing a selected method and/or datum in the object with the designated method and/or datum from the designated class. The altering may further comprise deleting the designated method and/or datum from the object by reinstantiating the object without the designated method and/or datum. The method and/or datum may be deleted if, e.g., it is unused for a predetermined time, uncalled for a predetermined number of invocations of the object, or compensates for the unavailability of a system resource that has become available.

A system corresponding to the above summarized method is also disclosed.

The present invention has several advantages and features associated with it. By facilitating the inheritance and disinheritance of methods and data to and from objects at run-time, efficient system resource utilization is facilitated. Inheriting methods and data into objects only when needed, and disinheriting them when no longer required, minimizes the size (i.e., "footprint") of an object. Smaller objects require less run-time storage and therefore use fewer system resources. Moreover, a single object can have greater versatility since it may adapt to its changing run-time environment by inheriting and disinheriting methods and data. Fewer and/or smaller objects are therefore required for a set of functions, again improving system resource utilization. Accordingly, the techniques disclosed herein advance the art of object-oriented programming.

BRIEF DESCRIPTION OF THE DRAWINGS

The subject matter regarded as the present invention is particularly pointed out and distinctly claimed in the concluding portion of the specification. The invention, however, both as to organization and method of practice, together with further objects and advantages thereof, may best be understood by reference to the following detailed description taken in conjunction with the accompanying drawings in which:

DETAILED DESCRIPTION OF THE PREFERRED EMBODIMENT

The present invention facilitates run-time inheritance and disinheritance of methods and data to and from the content of objects. By way of definition, the term "content" of an object is defined herein to mean the collection of methods and data included in an object. The techniques disclosed herein are described in connection with terminology and resources that will be apparent to one of ordinary skill in the art. In one example, the terminology and resources described herein are associated with the Common Object Request Broker Architecture ("CORBA"—a registered trademark of the Object Management Group, Inc.), an international standard for object management resources. One example of an entity included in CORBA type systems is an Object Request Broker ("ORB"), which is responsible for, e.g., creation, deletion and tracking of objects. A particular implementation of the CORBA standard is International Business Machines' System Object Model ("SOM") Objects Toolkit ("SOMobjects"). Further descriptions of CORBA and SOMobjects may be found in, e.g., "CORBA—A Guide To Common Object Request Broker Architecture," by Ron Ben-Natan, McGraw-Hill, 1995, "AIX Version 4.1 SOMobjects Base Toolkit User's Guide," IBM, 1993, Publication No. SC23-2680-01, and "AIX Version 4.1 SOMobjects Base Toolkit Programmers Reference Manual," IBM 1993, Publication No. SC23-2681-01, and "SOMobjects Developer Toolkit User's Guide," IBM, 1993, which are hereby incorporated herein by reference in their entireties.

Figure 6:
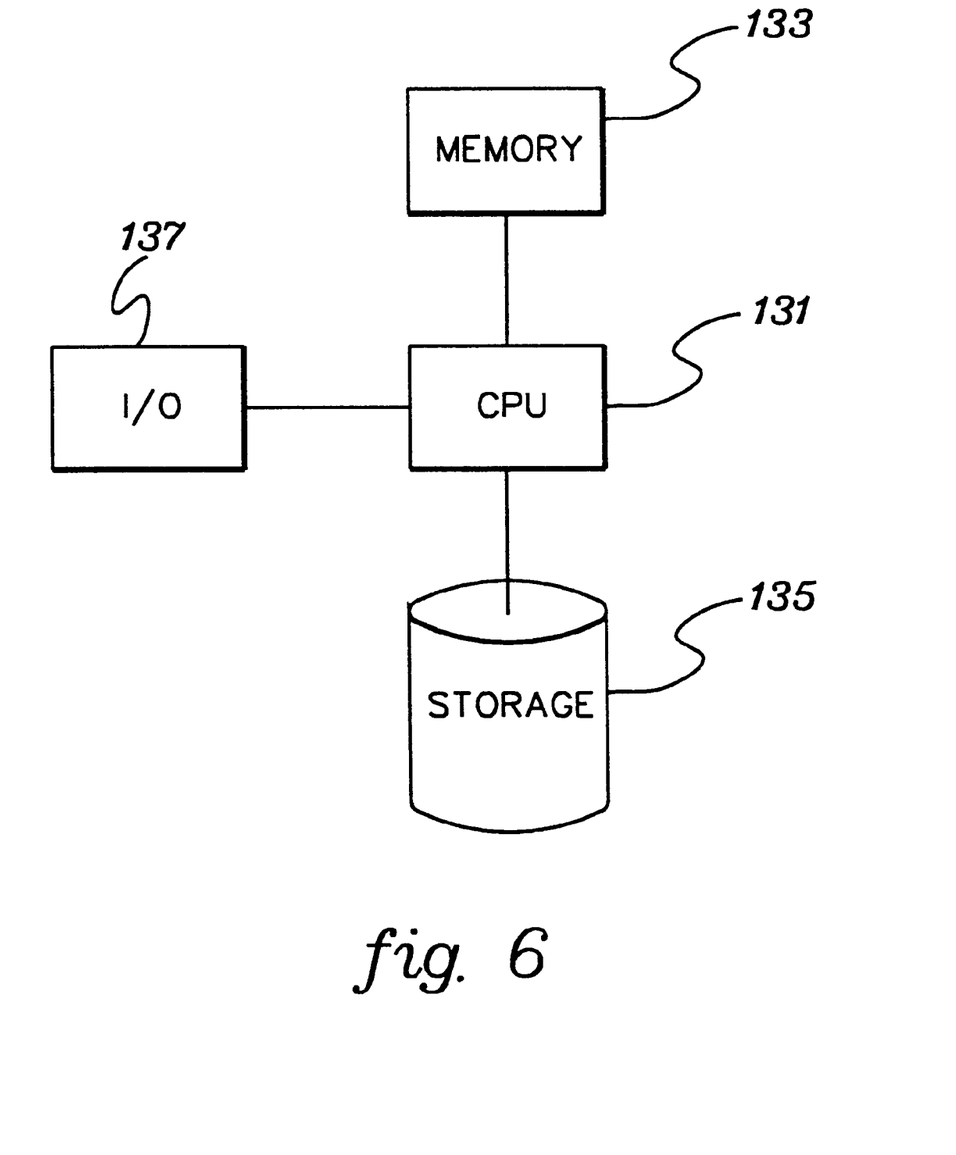
FIG. 6 is a diagram of one example of a system useful in implementing embodiments of the present invention.

The hardware elements of a computer system used to implement the techniques of the present invention are shown in FIG. 6. A central processing unit ("CPU") 131 provides main processing functionality. A memory 133 is coupled to CPU 131 for providing operational storage of programs and data. Memory 133 may include, for example, random access memory ("RAM") or read only memory ("ROM"). Non-volatile storage of, for example, data files and programs is provided by a storage 135 that may include, for example, disk storage. Both memory 133 and storage 135 are computer useable media that may store computer program products in the form of computer readable program code. User input and output is provided by user input/output ("I/O") facility 137. User I/O facility 137 may include, for example, a graphical display, a mouse and/or a graphics tablet. As an example, the system of FIG. 6 may be an "ES/9000 Mainframe Computer System" executing an "MVS" ("Multiple Virtual Storage") operating system from "IBM CORP."

By way of example, the techniques of the present invention are described in detail below in connection with inheriting and disinheriting methods used for matrix manipulation. However, as will be apparent to one of ordinary skill in the art, the same and similar techniques may be used in connection with methods of objects associated with many other functions. Further, inheriting and disinheriting data, at runtime, is performable using similar techniques to those discussed herein for methods, and are discussed in a further section hereinbelow.

Figure 1:
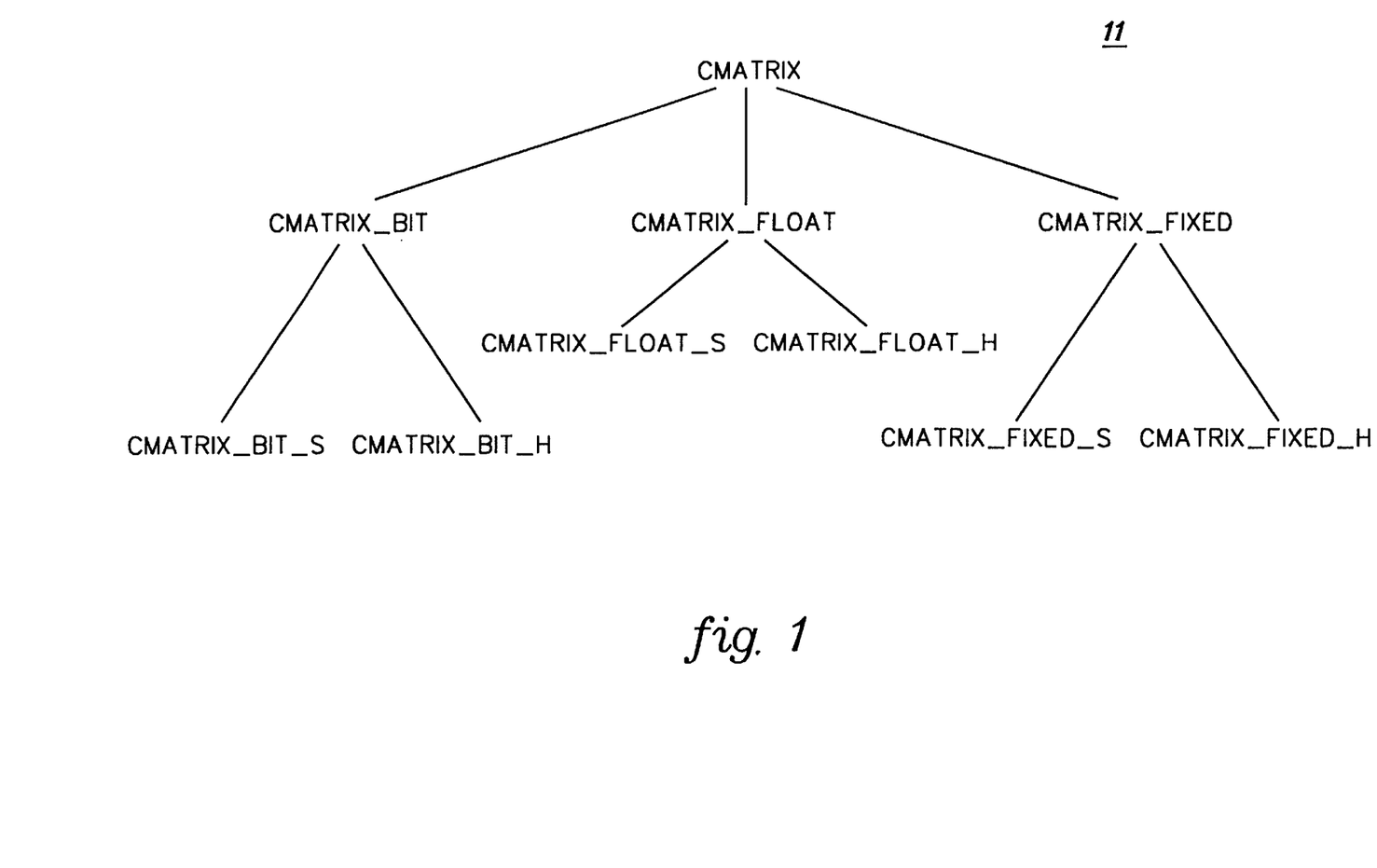
FIG. 1 is an example of a class hierarchy useful in connection with the techniques of the present invention.

Shown in FIG. 1 is a hierarchy for classes used in connection with matrix manipulation. The base class CMATRIX, is defined to include, for example, the following methods:

ADD(INPUT_MATRIX1, INPUT_MATRIX2, OUTPUT_MATRIX)
INVERSE(INPUT_MATRIX, OUTPUT_MATRIX)
MULTIPLY(INPUT_MATRIX1, INPUT_MATRIX2, OUTPUT_MATRIX)

As their names imply, ADD adds two matrices, INVERSE inverts a matrix and MULTIPLY multiplies two matrices. No definition of the matrices' sizes, or of the matrices' elements' data types are provided as these will be further defined in descendant classes discussed immediately hereinbelow.

The base class, CMATRIX, has, for instance, three offspring (CMATRIX_BIT, CMATRIX_FLOAT and CMATRIX_FIXED), each of which includes methods tailored to specific data types for the matrices' elements. Specifically, the ADD, INVERSE and MULTIPLY methods are tailored to bit matrix elements (i.e., 1 or 0) in CMATRIX_BIT, floating-point matrix elements in CMATRIX_FLOAT and fixed-point matrix elements in CMATRIX_FIXED. In one embodiment, each of the three offspring of CMATRIX has two offspring, one with methods designed for a small sized matrix (e.g., CMATRIX_BIT_S) and the other with methods designed for a huge sized matrix (e.g., CMATRIX_BIT_H). To summarize, the matrix size and element data type for the methods of each of the classes in the hierarchy of FIG. 1 are shown below:

| Class Name | Matrix Data Type | Matrix Size |
|---|---|---|
| CMATRIX | — | — |
| CMATRIX_BIT | Bit | — |
| CMATRIX_BIT_S | Bit | Small |
| CMATRIX_BIT_H | Bit | Huge |
| CMATRIX_FLOAT | Floating Point | — |
| CMATRIX_FLOAT_S | Floating Point | Small |
| CMATRIX_FLOAT_H | Floating Point | Huge |
| CMATRIX_FIXED | Fixed Point | — |
| CMATRIX_FIXED_S | Fixed Point | Small |
| CMATRIX_FIXED_H | Fixed Point | Huge |

Matrices are manipulated using objects instantiated from the foregoing classes. In one example, most matrix operations are performed on small sized matrices of fixed-point type elements, and therefore, an object instantiated from the CMATRIX_FIXED_S class is used. However, it may be become necessary to perform operations on huge matrices of fixed-point type elements. Therefore, according to the techniques disclosed herein, an object is instantiated and includes the required method of the CMATRIX_FIXED_H class along with the methods from the CMATRIX_FIXED_S class, at run-time. The footprint of the subject object is thus only enlarged when necessary, at run-time, thereby improving the efficiency of system resource usage.

Figure 2:
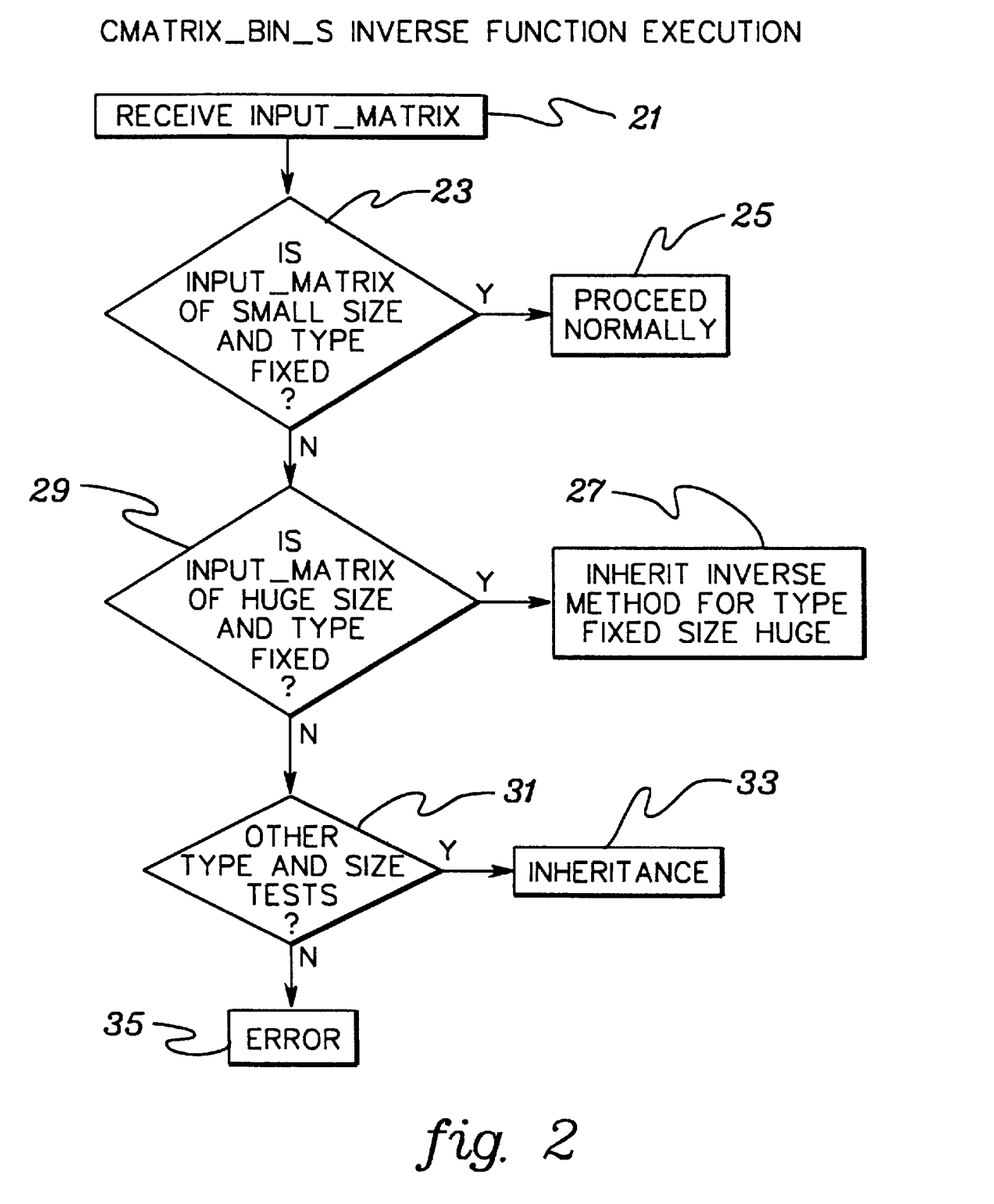
FIGS. 2–3 are flow diagrams of a process for run-time inheritance of a method into an object pursuant to one embodiment of the present invention.

The techniques for inheriting a huge matrix method into an object instantiated from the CMATRIX_FIXED_S class, at run-time, are described hereinbelow with respect to the flow-diagram of FIG. 2. Specifically, the logic of an object instantiated from the CMATRIX_FIXED_S class that facilitates run-time method inheritance from the CMATRIX_FIXED_H class is described.

An object is instantiated from the CMATRIX_FIXED_S class, and during run-time processing the object is passed an INPUT_MATRIX for inversion using the objects' INVERSE method, STEP 21. A test is performed within the programmed logic of the object's methods to determine if the INPUT_MATRIX is compatible with the methods of the object. Specifically, the INPUT_MATRIX is tested to determine if it is a small-sized matrix with elements of the fixed-point type, INQUIRY 23. If the INPUT_MATRIX is of the small/fixed-point type then processing proceeds normally, STEP 25.

If an INPUT_MATRIX other than the small, fixed-point type is presented to the object, tests are performed to determine if INPUT_MATRIX is of a type for which method inheritance is desired. For example, INPUT_MATRIX is tested to determine if it is of a huge size and has elements of a fixed-point data type, STEP 29. If yes, the INVERSE method for a huge, fixed-point matrix is inherited, STEP 27, as discussed in detail hereinbelow, and processing using the inherited method continues. If no, other tests for other size and type matrices are performed, STEP 31, and inheritance is performed if appropriate, STEP 33. If the INPUT_MATRIX is not of a type for which inheritance of an appropriate method is desired, then an error is generated and returned to the invoker, STEP 35.

One embodiment of the particular steps for inheriting a method into an object, at run-time, are described below with respect to the flow-diagram of FIG. 3.

Figure 3:
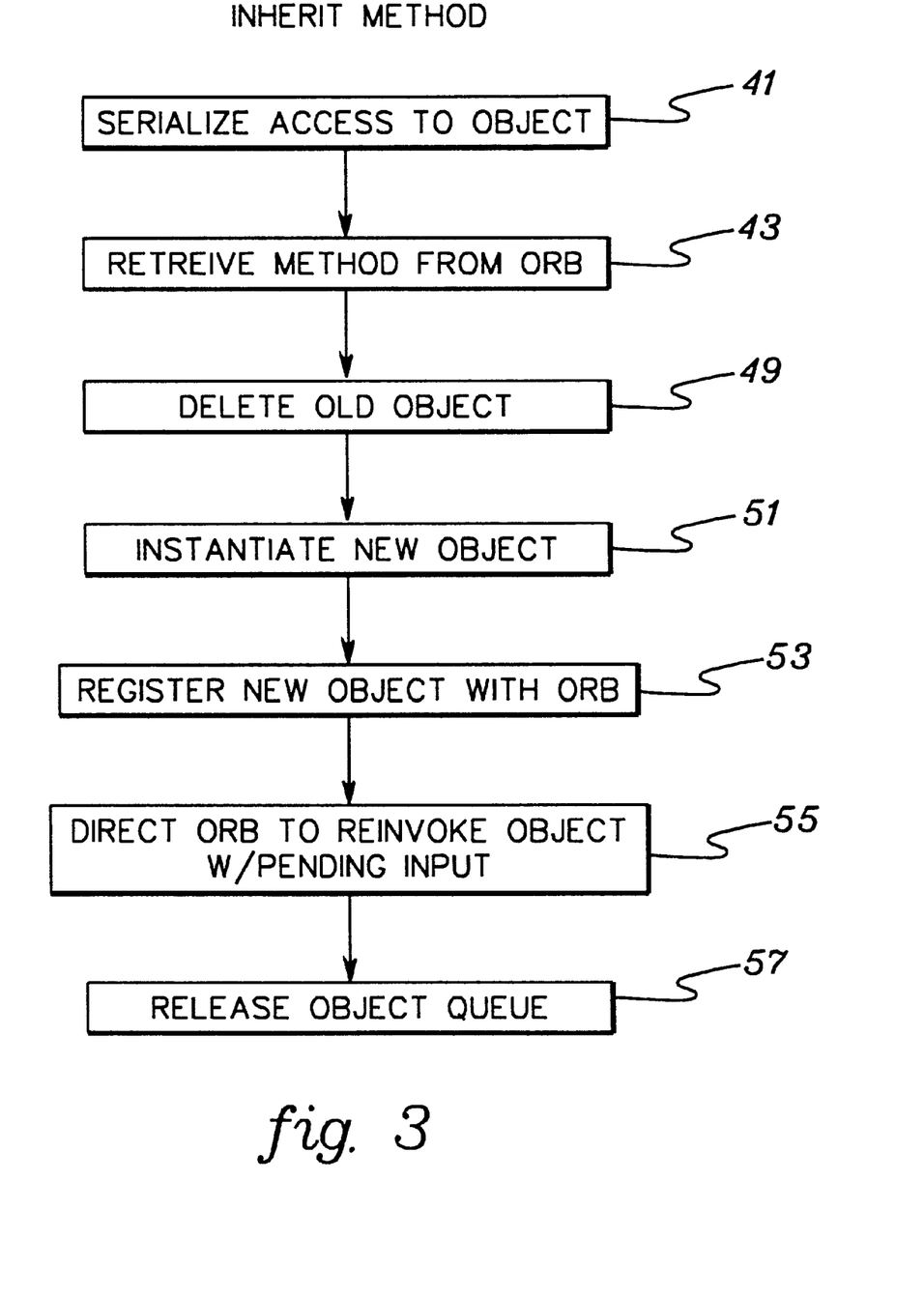

The steps of FIG. 3 result from a call for inheritance of a method from within an object. This call for inheritance is implemented by a compiler directive that is within the object's programmed logic and is defined, e.g., as follows:

@INHERIT_METHOD(<class_name>, <method_name> |, <new_method name>|)

| class_name - | the name of the class where the method to be inherited is defined. |
| --- | --- |
| method_name - | the name of the method to be inherited. |
| new_method_name - | an optional name to give the inherited method in the current object (by default, the method name in the current object will equal. the method name in the class the method is being inherited from) |

When the compiler encounters this directive (i.e., when compiling the object), the directive is translated into programmed logic to implement the below described run-time steps. A first step in inheriting a method into an object includes serializing access to the object, STEP 41. This includes, for example, suspending access to the object (the use of semaphores to serialize invocations of an object's methods is well known). In, e.g., an "MVS" ("Multiple Virtual Storage") computing environment, the serialization can be performed using, for instance, an ENQ ("Enqueue") system macro.

In a next step, the desired method ("method_name") is retrieved from its class ("class_name"), STEP 43, for instantiation into the current object. Such retrieval is performed using, for instance, the multiple inheritance available within object-oriented languages. Before reinstantiating a new object with the desired methods inherited, the old object is deleted using conventional Object Request Broker ("ORB") functions, STEP 49. Thereafter, a new object is instantiated, STEP 51, using the methods from its current class definition (CMATRIX FIXED S) in addition to the methods inherited (e.g., method name=INVERSE) from another class (e.g., class_name=CMATRIX_FIXED_H). An object with the desired methods inherited is thus created.

More specifically, one method for instantiating the new object, with the additional methods, is performed using the creation of a temporary file that contains a class definition for the new object. This class definition includes the original class source code (e.g., CMATRIX_FIXED_S), and the appropriate multiple inheritance from another class (e.g., CMATRIX_FIXED_H). For example, the original class, CMATRIX_FIXED_S, is defined as follows:

class CMATRIX_FIXED_S

```
{
    ADD_FIXED_S (...) { ...} ;
    INVERSE_FIXED_S (...) { ...} ;
    MULTIPLY_FIXED_S (...) { ...} ;
}
```

Additionally, the class CMATRIX_FIXED_H is defined as follows:

class CMATRIX_FIXED_H

```
{
    ADD_FIXED_H (...) { ...} ;
    INVERSE_FIXED_H (...) { ...} ;
    MULTIPLY_FIXED_H (...) { ...} ;
}
```

If it were desirable to include all methods from CMATRIX_FIXED_H in the new object, a segment could be defined as follows:

class CMATRIX_FIXED_S_NEW: CMATRIX_FIXED_S, CMATRIX_FIXED_H{ };

Compilation of the class CMATRIX_FIXED_S_NEW would include all methods of classes CMATRIX_FIXED_S and CMATRIX_FIXED_H. Temporary class CMATRIX_FIXED_S_NEW could then be used to instantiate a new object having all the methods from the two classes.

However, in the current example, it is desirable to only include the INVERSE method from the class CMATRIX_FIXED_H. To avoid including unnecessary methods from CMATRIX_FIXED_H in the new class, the unnecessary methods are overridden with NOOPs (no operation codes) in the temporary class. Accordingly, the temporary class CMATRIX_FIXED_S_NEW is defined as follows:

class CMATRIX_FIXED_S_NEW: CMATRIX_FIXED_S, CMATRIX_FIXED_H

```
{
    ADD_FIXED_H (...) { }; // NOOP METHOD //
    MULTIPLY_FIXED_H (...){ }; // NOOP METHOD //
}
```

As discussed hereinabove, the new method can have a different name than it had in the class it is being inherited from. For example, the INVERSE_FIXED_H method from the CMATRIX_FIXED_H class could be inherited as a method called INVERSE_NEW. This would be performed by generating a class definition similar to that shown hereinabove, however, the INVERSE_FIXED_H method would be NOOPed, and the source code therefrom (conventionally available to the compiler) would be incorporated into a new method definition. For example, the following segment would be generated:

class CMATRIX_FIXED_S_NEW: CMATRIX_FIXED_S, CMATRIX_FIXED_H

```
{
INVERSE_FIXED_H (...) { };        // NOOP METHOD //
INVERSE_NEW (...) {               // SAME PARAMETER LIST
                                  AS INVERSE_FIXED_H //
                                  // COPY OF THE CODE FOR
                                  THE INVERSE_FIXED_H
                                  METHOD //
                 };
ADD_FIXED_H (...) { };            // NOOP METHOD //
MULTIPLY_FIXED_H (...) { };       // NOOP METHOD //
}
```

To continue with the method shown in FIG. 3, the new object is registered with the ORB, STEP 53. The ORB is then directed to reinvoke the new object, STEP 55, with the same data that was previously used to invoke the (old) object. As a result, the data will be processed by the new object using the inherited method. For instance, in the current example, the new object is reinvoked with the fixed-point, huge matrix that was previously unprocessable. However, because of the inheritance of the fixed-point, huge matrix processing method (i.e., e.g., INVERSE), this matrix is now processed by the new object.

After reinvocation of the object has completed, the object is released for use by other invokers, STEP 57, and processing continues. In, e.g., an "MVS" ("Multiple Virtual Storage") computing environment, the release of the object can be performed using, for instance, a DEQ ("dequeue") system macro.

In more specific regard to the above process, a new mechanism is used within the logic of the object's methods to permit reinvocation of the new object's methods using the data from the old object method invocation. Upon initiation of the steps used to inherit a new method, the old object's method's parameter list is stored in e.g. memory or a file. This parameter list includes the data that the old method that was invoked with, along with any internal parameters that are maintained between invocations. After inheritance is complete, and prior to releasing the object for use, the parameter list is read in, and the new object is configured accordingly. Further, the data that the old object's method was invoked with is used to redrive the new method in the newly instantiated object.

As discussed above, the inherited method may be used only a few of the times that any of the object's methods are invoked. It may therefore become advantageous to eventually disinherit the inherited method such that the resources required by the inherited method within the object are freed. A determination of when to perform disinheritance may be based on factors including, e.g., how long since the method was last used in time and/or object method invocations. In the foregoing example, if, for instance, one-thousand method invocations of the object have occurred without requiring any inverting of fixed-point, huge matrices (the inherited method), it may be desirable to disinherit the fixed-point, huge matrix invert method such that system resources used by the object are minimized.

Figure 4:
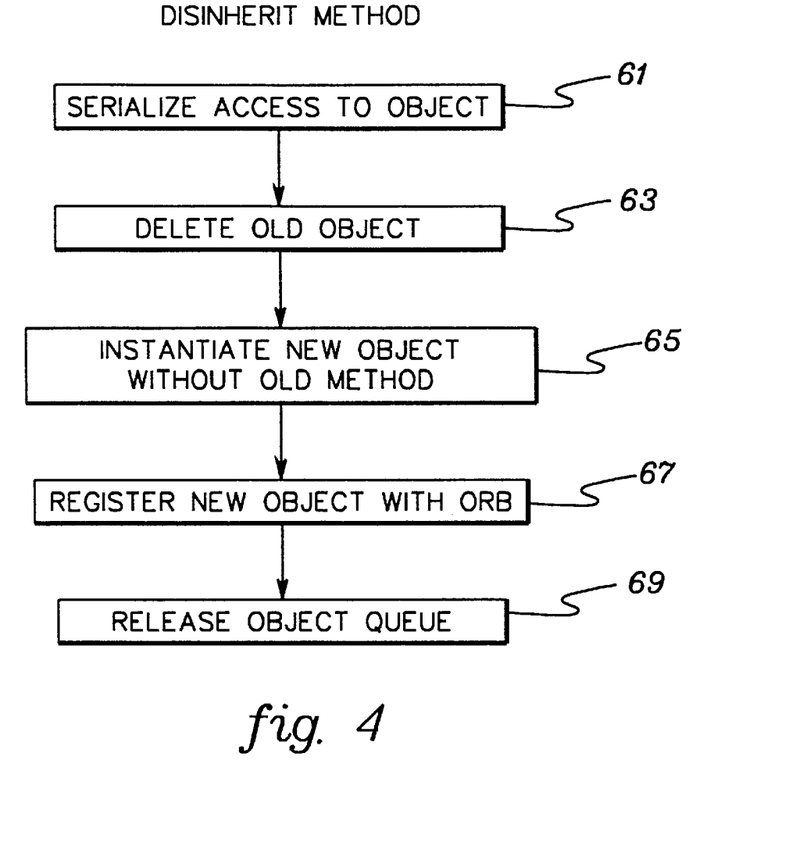
FIG. 4 is a flow diagram of a process for run-time disinheritance of a method from an object according to an embodiment of the present invention.

The particular steps for disinheriting a method from an object, at run-time, are described below with respect to the flow-diagram of FIG. 4.

A call for disinheritance of a method from within an object is implemented by a compiler directive that is within the object's programmed logic and defined, e.g., as follows:

@DISINHERIT_METHOD(<method_name>)

method_name—the name of the method to be disinherited.

When the compiler encounters this directive (i.e., when compiling the object), it is translated into programmed logic to implement the below-described steps. A first step in disinheriting a method from an object includes serializing access to the object, STEP 61. Again, this includes suspending invocations of the object. In, e.g., an "MVS" ("Multiple Virtual Storage") computing environment, the serialization can be performed using, for instance, an ENQ ("Enqueue") system macro.

In a next step, the (old) object is deleted using conventional ORB functions, STEP 63. After that, a new object is instantiated, STEP 65, from the current class definition (CMATRIX_FIXED_S) and excluding the method to be disinherited. An object with the desired methods is thus created. The new object is automatically registered with the ORB by way of its instantiation, STEP 67, the object released, STEP 69, and processing continues. In, e.g., an "MVS" ("Multiple Virtual Storage") computing environment, the release of the object can be performed using, for instance, a DEQ ("dequeue") system macro.

Described above are examples of techniques for inheriting and disinheriting a method. It will be apparent to those of ordinary skill in the art that the above-described flows and sequences of steps are only examples. There can be many variations to the above, including, for instance, processing more or less than the steps described above, modifying one or more of the steps, or changing the order of some of the steps without departing from the true spirit and scope of the present invention. These variations are, therefore, considered a part of the claimed invention.

As one example application, the techniques of the present invention can be used to dynamically adapt (i.e., at run-time) to changing hardware system resources, while maintaining objects with efficient footprints (i.e., system resources required). As an example, the class hierarchy of FIG. 1 is referred to in connection with the additional classes of FIG. 5. These additional classes include methods optimized for matrix manipulation using either a hardware vector processor for performing floating-point calculations, or using software emulation of a vector processor. It is generally more desirable to use a vector processor due to greater execution speed and smaller code requirements (i.e., compared to software emulation that requires extensive code libraries and executes more slowly than hardware based vector floating-point processing). An object that includes both types of processing methods would be inefficient for a situation where a vector processor was available since the program code used for software floating-point emulation would go unused, but would nonetheless increase the footprint of the object.

Figure 5:
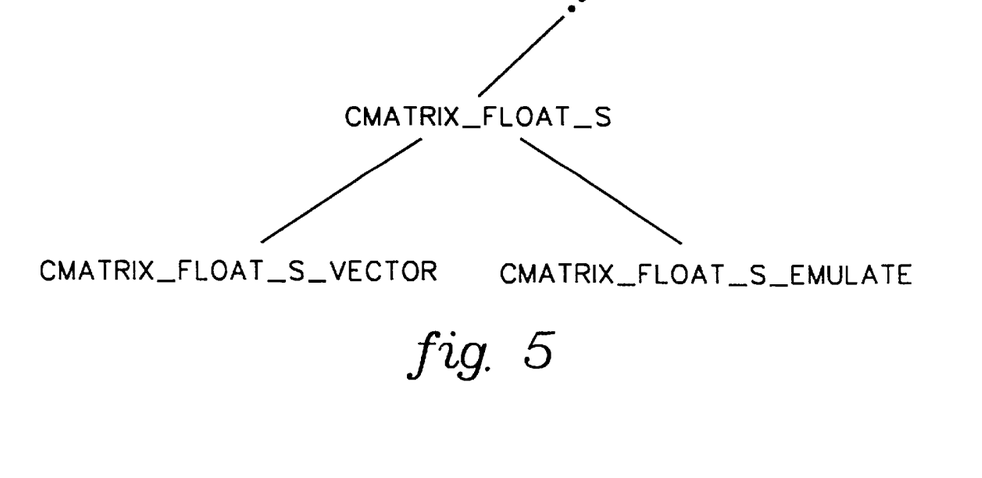
FIG. 5 is one example of an extension to the class hierarchy of FIG. 1 that is useful in association with the techniques of the present invention.

In specific regard to the above example, an object is instantiated for use and impressed with the CMATRIX_FLOAT_S_VECTOR class (i.e., its target machine usually has an installed vector processing facility). The configuration of the target machine's hardware may, however, change during operations, making the vector facility unavailable (i.e., by a hardware failure, or a general system configuration change). Processing can therefore not continue using the current object. Accordingly, upon detection of the vector facility being unavailable, the object may use the techniques disclosed herein to inherit the methods and corresponding software emulation based methods from the CMATRIX_FLOAT_S_EMULATE class and processing may continue. Conversely, when the object detects that the vector facility has become available, the software emulation based methods may be disinherited in favor of the vector facility based methods.

The above described techniques for inheriting and disinheriting object methods at runtime can also be used for inheriting and disinheriting object data (i.e., data variables or structures defined in classes that objects are instantiated from) at runtime. Additional syntactic constructs are defined which correspond to the "@INHERIT_METHOD" and "@DISINHERIT_METHOD" directives discussed hereinabove. For example, the following compiler directives are defined:

@INHERIT_DATA(<class_name>, <datum_name> |, <new_datum_name>|)

| | |
|---|---|
| class_name - | the name of the class where the datum to be inherited is defined. |
| datum_name - | the name of the datum (i.e., variable) to be inherited. |
| new_datum_name - | an optional name to give the inherited datum in the current object (by default, the datum name in the current object will equal the datum name in the class the datum is being inherited from) |

@DISINHERIT_DATA(<datum_name>)

| | |
|---|---|
| datum_name - | the name of the datum to be disinherited. |

Using the foregoing directives, and substituting datum (i.e., variable) names (and/or values) for the method names previously utilized, the same variable. (and/or value) described hereinabove for inheriting and disinheriting methods are useable to inherit and disinherit datum.

As an example, class CMATRIX_BIT_S (FIG. 1) could include in its definition a unitary matrix that has the values of binary 1 along its diagonal and binary 0 elsewhere, represented as an array. Similarly, class CMATRIX_BIT_H includes the same unitary matrix represented as a list of elements along the diagonal having a binary 1 value, and omits the binary 0 values elsewhere to conserve space. If an object instantiated as an object of CMATRIX_BIT_S would for any reason inherit (using the method inheritance techniques of the present invention) the method for processing huge, bit matrices, it could similarly inherit the unitary matrix datum appropriate therefor.

To summarize, the present invention has several advantages and features associated with it. By facilitating the inheritance and disinheritance of methods and data to and from objects at run-time, efficient system resource utilization is facilitated. Inheriting methods into objects only when needed, and disinheriting them when no longer required, reduces the size (i.e. "footprint") of an object. Smaller objects require less run-time storage and therefore use fewer system resources. Moreover, a single object can have greater versatility since it may adapt to its changing run-time environment by inheriting and disinheriting methods and data. Fewer objects are therefore required for a set of functions, again improving system resource utilization. Accordingly, the techniques disclosed herein advance the art of object-oriented programming.

While the invention has been described in detail herein, in accordance with certain preferred embodiments thereof, many modifications and changes thereto may be affected by those skilled in the art. Accordingly, it is intended by the appended claims to cover all such modifications and changes as fall within the true spirit and scope of the invention.

What is claimed is:

1. In an object-oriented run-time environment, wherein an object is instantiated and executing and comprises a content, said content including at least one of a method and a datum, said method performing at least one designated function, said datum for storing at least one value, a process, initiated by said object, for altering said object at run-time comprising:

(a) identifying an alteration to said content of said object; and (b) altering, at run-time, said object by performing said alteration to said content of said object.

2. In an object-oriented run-time environment, wherein an object is instantiated and executing and comprises a content, said content including at least one of a method and a datum, said method performing at least one designated function, said datum for storing at least one value, a process, initiated by said object for altering said object at run-time comprising:

(a) identifying an alteration to said content of said object; and (b) altering at run-time, said object by performing said alteration to said content of said object, wherein said altering comprises one of: adding one of a designated method and a designated datum to said content of said object; and deleting one of said designated method and said designated datum from said content of said object.

3. In object-oriented run-time environment, wherein an object is instantiated and executing and comprises a content, said content including at least one of a method and a datum, said method performing at least one designated function, said datum for storing at least one value, a process, initiated by said object, for altering said object at run-time comprising:

(a) identifying an alteration to said content of said object; and (b) altering, at run-time, said object by performing said alteration to said content of said object and;

(c) after said altering, registering said object with an object manager executing in said object-oriented run-time environment.

4. In an object-oriented run-time environment, wherein an object is instantiated and executing and comprises a content, said content including at least one of a method and a datum, said at least one method performing at least one designated function, said datum for storing at least one value, a system for altering said object at run-time, said altering initiated by said object, comprising:

means for identifying an alteration to said content of said object; and means for altering, at run-time, said object by performing said alteration to said content of said object.

5. In an object-oriented run-time environment, wherein an object is instantiated and executing and comprises a content, said content including at least one of a method and a datum, said at least one method performing at least one designated function, said datum for storing at least one value, a system for altering said object at run-time, said altering initiated by said object, comprising:

means for identifying an alteration to said content of said object; and means for altering, at run-time, said object by performing said alteration to said content of said object, wherein said means for altering comprises means for one of: adding one of a designated method and a designated datum to said content of said object; and deleting one of said designated method and said designated datum from said content of said object.

6. In an object-oriented run-time environment, wherein an object is instantiated and executing and comprises a content, said content including at least one of a method and a datum, said at least one method performing at least one designated function, said datum for storing at least one value, a system for altering said object at run-time, said altering initiated by said object, comprising:

means for identifying an alteration to said content of said object;

means for altering, at run-time, said object by performing said alteration to said content of said object; and means for registering said object with an object manager executing in said object-oriented run-time environment.

7. An article of manufacture comprising:

computer usable media having computer readable program code means embodied therein for an object-oriented run-time environment, wherein an object is instantiated and executing and comprises a content, said content including at least one of a method and a datum, said method performing at least one designated function, said datum for storing at least one value, said code means for altering said object at run-time, said altering initiated by said object, said code means comprising:

code means for identifying an alteration to said content of said object; and code means for altering, at run-time, said object by performing said alteration to said content of said object.

8. An article of manufacture comprising:

computer usable media having computer readable program code means embodied therein for an object-oriented run-time environment, wherein an object is instantiated and executing and comprises a content, said content including at least one of a method and a datum, said at least one method performing at least one designated function, said datum for storing at least one value, said code means for altering said object at run-time, said altering initiated by said object, said code means comprising:

code means for identifying an alteration to said content of said object; and code means for altering, at run-time, said object by performing said alteration to said content of said object, wherein said code means for altering comprises code means for one of: adding one of a designated method and a designated datum to said content of said object; and deleting one of said designated method and said designated datum from said content of said object.

9. An article of manufacture comprising:

computer usable media having computer readable program code means embodied therein for an object-oriented run-time environment, wherein an object is instantiated and executing and comprises a content, said content including at least one of a method and a datum, said at least one method performing at least one designated function, said datum for storing at least one value, said code means for altering said object at run-time, said altering initiated by said object, said code means comprising:

code means for identifying an alteration to said content of said object;

code means for altering, at run-time, said object by performing said alteration to said content of said object; and code means for registering said object with an object manager executing in said object-oriented run-time environment.

* * * * *